United States Patent Office 3,141,015
Patented July 14, 1964

3,141,015
HOMOPIPERAZINOALKYL ESTERS
John H. Biel and Wallace K. Hoya, Milwaukee, Wis., assignors to Colgate-Palmolive Company, a corporation of Delaware
No Drawing. Filed Dec. 23, 1960, Ser. No. 77,841
2 Claims. (Cl. 260—239)

This invention relates to homopiperazine. More particularly, this invention is concerned with novel disubstituted acetates and glycolates of homopiperazinoalkanols and uses for such compounds, including pharmaceutical uses.

According to the present invention, there are provided novel compounds of the formula

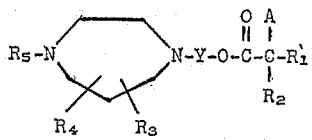

wherein $R_1$ and $R_2$ are the same or different substituents of the group consisting of phenyl, halophenyl groups such as p-chlorophenyl, lower alkoxyphenyl groups such as p-methoxyphenyl, p-hydroxyphenyl, p-aminophenyl, lower alkyl-phenyl groups such as p-methylphenyl, lower alkylenedioxyphenyl groups such as 3,4-methylenedioxyphenyl, thienyl, furyl, pyridyl, cycloalkyl groups of 3 to 7 carbons such as cyclopentyl, cyclohexyl or cyclopropyl, or lower alkyl groups such as methyl, ethyl and propyl, but one of $R_1$ and $R_2$ is advisably always a cyclic group, $R_3$ and $R_4$ are hydrogen or a lower alkyl such as methyl, ethyl or propyl, $R_5$ represents hydrogen, lower alkyl groups such as methyl, ethyl, propyl and isopropyl, aryl groups such as phenyl and nuclear substituted phenyl groups such as p-aminophenyl, a halophenyl group such as p-chlorophenyl, a lower alkoxyphenyl group such as m-methoxyphenyl, and poly-lower alkoxyphenyl groups such as the m,p-dimethoxyphenyl group, hydroxyphenyl group such as the p-hydroxyphenyl group, lower alkylenedioxyphenyl groups such as 3,4-methylenedioxyphenyl, and poly-hydroxyphenyl groups such as the o,p-dihydroxyphenyl group, aralkyl groups such as the phenyl-lower alkyl groups such as phenylmethyl, phenylethyl, phenyl-isopropyl and phenyl-lower alkyl groups in which the phenyl ring contains one or more nuclear substituents such as halogens and particularly bromine or chlorine, the hydroxy group, lower alkoxy groups such as the methoxy group and the amino group, a lower alkenyl group such as the allyl group and phenyl-lower alkenyl groups such as the cinnamyl group, lower alkynyl groups such as propargyl, hydroxy-lower alkyl groups such as hydroxy-methyl and hydroxypropyl, hydroxy-lower alkoxy-lower alkyl groups such as hydroxyethoxymethyl, acetoxy-lower alkoxy-lower alkyl groups such as acetoxyethoxyethyl, and acetoxy-lower alkyl groups such as acetoxyethyl, A is hydrogen or hydroxy, and Y is a straight or branched lower alkylene of at least two carbons, and advisably not more than five carbons, and acid addition and quaternary ammonium salts thereof.

The described compounds, advisably as nontoxic acid addition salts, are skeletal muscle relaxants and moderately potent central stimulants which also relieve nervous tension. Animals which are administered the compounds are more active but relaxed and alert. The compounds thus could be effective in the treatment of mild depression and as alerting agents in stimulating and increasing learning behavior. At the same time, these compounds give a general feeling of relaxation. These compounds are more effective central nervous system stimulants and are less toxic than compounds in which the homopiperazino group is replaced by the piperazino group.

The compounds of this invention in which $R_5$ is not hydrogen can be conveniently produced by several processes, one of which comprises reacting a lower alkyl disubstituted acetate or glycolate with a 4-substituted homopiperazino-alkanol to produce the desired 4-substituted homopiperazino-alkyl-disubstituted acetate or glycolate. This process can be represented as follows:

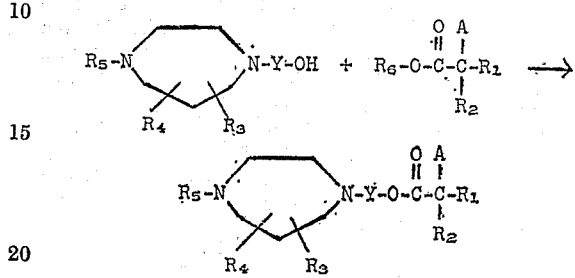

wherein $R_1$, $R_2$, $R_3$, $R_4$, $R_5$, A and Y have the assigned significance but $R_5$ is not hydrogen, and $R_6$ is a lower alkyl such as methyl, ethyl or propyl.

Some of the disubstituted acetates and glycolates which can be used in the process are methyl alpha-ethyl alpha-phenyl acetate, methyl diphenylacetate, methyl phenyl 2-thienyl acetate, methyl phenylcyclohexyl acetate, ethyl phenylcyclopentyl acetate, methyl dicyclohexyl acetate, methyl p-chlorophenylcyclopentyl acetate, ethyl 3-pyridyl phenyl acetate, methyl benzilate, methyl phenylcyclohexyl glycolate, ethyl phenylcyclopentyl glycoate, methyl 2-thienyl phenyl glycolate, ethyl phenyl propyl glycolate, methyl dicyclohexyl glycolate, ethyl 3,4-methyenedioxyphenyl furyl glycolate and methyl p-methoxyphenyl-3-pyridyl glycolate.

Some of the 4-substituted homopiperazinoalkanols which can be used in this process are 4-methylhomopiperazinoethanol, 4-ethylhomopiperazino-3-propanol, 4-allylhomopiperazino-2-propanol, 4 - cinnamylhomopiperazinoethanol, 4-phenylhomopiperazino-3-butanol, 4-benzylhomopiperazino-2-butanol, 4-p-methoxyphenylethylhomopiperazino-4-pentanol, 4 -phenylpropylhomopiperazino-2-propanol, 2-methyl-4-ethylhomopiperazino-3-butanol.

Reaction between the lower alkyl disubstituted acetate or glycolate and the 4-substituted homopiperazinoalkanol is conveniently effected by bringing the reactants together in a suitable inert solvent in the presence of an alkali metal catalyst such as sodium, sodium hydride, sodium methoxide, sodium ethoxide and potassium t-butoxide. Solvents such as n-heptane, xylene or toluene can be used for the reaction medium. The mixture is generally heated to promote the reaction with the reflux temperature being preferred. As the reaction proceeds, the lower alcohol which is formed in the reaction is distilled off. The reaction is considered completed when low boiling alcohol no longer distills off. The product is recovered by acidifying the reaction mixture, evaporating to dryness, taking the residue up in water, adding a base such as caustic soda to the aqueous solution and extracting with an immiscible solvent. The extract can then be dried and the product recovered by distillation.

Representative of the products which are produced in this way are 4-methylhomopiperazinoethyl phenylcyclohexyl acetate, 4-ethylhomopiperazino-2-propyl phenyl 2-thienyl acetate,
4-phenylhomopiperazinoethyl phenyl 3-pyridyl acetate,
4-benzylhomopiperadino-3-butyl phenylcyclopentyl acetate,
4-allyhomopiperazinoethyl furyl alpha-propyl acetate,
4-methylhomopiperazinoethyl benzilate, 4-ethylhomopiperazino-3-butyl benzilate,
4-phenylhomopiperazino-2-propyl benzilate,
4-benzylhomopiperazinoethyl benzilate,
4-allylhomopiperazino-3-butyl benzilate,
4-cinnamylhomopiperazino-2-propyl phenylcyclohexyl glycolate,
4-phenylethylhomopiperazino-2-propyl phenylcyclopentyl glycolate,
4-phenylpropylhomopiperazinoethyl phenyl 2-thienyl glycolate,
4-allylhomopiperazino phenyl 3-chlorophenyl glycolate,
4-benzylpiperazino-2-propyl furyl propyl glycolate and
2-methyl-4-methylhomopiperazinopropyl benzilate.

An alternate method of producing some of the 4-substituted homopiperazino compounds wherein the glycolate substituents are both aryl comprises reacting a di-aryl substituted halo or acyloxy acetyl halide with a 4-substituted homopiperazinoalkanol to produce an intermediate 4-substituted homopiperazinoalkyl di-aryl substituted halo or acyloxy acetate which is subsequently hydrolyzed to the corresponding 4-substituted homopiperazinoalkyl di-aryl substituted glycolate. This process can be represented as follows:

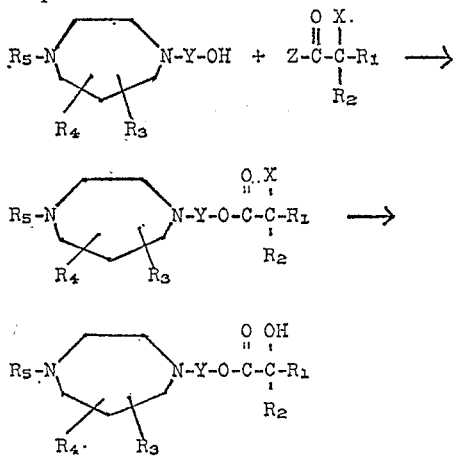

wherein $R_1$ and $R_2$ are the same or different phenyl, substituted phenyl, thienyl or pyridyl groups, $R_3$, $R_4$, $R_5$ and Y have the significance previously assigned, except that $R_5$ is not hydrogen, Z is a reactive halogen and advisably chlorine, and X is a reactive halogen such as chlorine or a reactive acyloxy group such as acetoxy.

Representative di-aryl substituted halo or acyloxy acetates which can be used in the process are diphenylchloroacetyl chloride, phenyl 2-thienyl chloroacetyl chloride, diphenyl acetoxy acetyl chloride and 3-pyridyl p-chlorophenyl chloroacetyl chloride.

4-substituted homopiperazinoalkanols such as those previously named can be used in the process.

In the first step of this process the reactants can be conveniently brought together in an inert organic solvent such as benzene, toluene, isopropanol or acetone. An acid acceptor such as triethylamine is generally included in the reaction mixture. Elevated temperatures up to the reflux temperature are generally employed to enhance the rate of reaction and maintain solubility of the reactants. The reaction product can be recovered from the mixture by conventional methods.

Some of the compounds which are produced in this way are 4-methylhomopiperazino-2-propyl diphenylchloroacetate, 4-phenylhomopiperazinoethyl phenyl-2-thienyl chloroacetate, 4-benzylhomopiperazino-2-propyl phenyl-3-pyridyl chloroacetate and 2-methyl-4-allylhomopiperazinoethyl diphenylchloroacetate.

These and other compounds within the scope of this invention are readily hydrolyzed to the corresponding 4-substituted homopiperazinoalkyl di-aryl substituted glycolate, advisably with a mineral acid and preferably with hydrochloric acid.

The homopiperazinoalkyl acetates and glycolates having no substituent in the 4-position of the homopiperazine group can be produced from the N-benzyl homopiperazinoalkyl acetates and glycolates by catalytic hydrogenation with cleavage of the N-benzyl group. This process can be represented as follows:

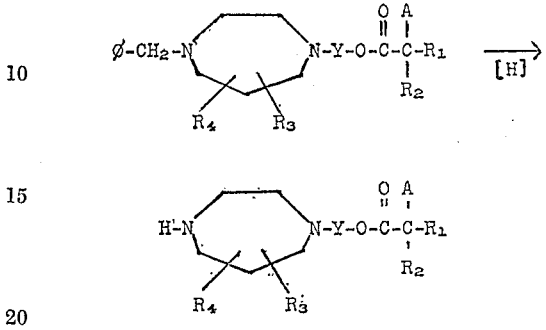

wherein $R_1$, $R_2$, $R_3$, $R_4$, Y and A have the significance previously assigned and $\phi$ is phenyl.

The catalytic reductive cleavage is readily effected by adding the N-benzly homopiperazinoalkyl acetate or glycolate, advisably as an acid addition salt, to a solvent such as water or a lower alcohol, adding a catalyst such as palladium, and hydrogen under pressure, as up to about 100 p.s.i. A small amount of glacial acetic acid is generally included to promote the reaction. The hydrogenation proceeds quickly and its progress can be measured by the hydrogen uptake. When the hydrogen uptake ceases the reaction can be considered completed. After filtering the reaction mixture it be evaported to dryness and the product triturated with a solvent such as ether and separated by filtration.

Some of the compounds produced in this way from the corresponding 4-benzyl homopiperazinoalkyl acetates and glycolates are homopiperazinoethyl diphenylacetate, homopiperazino-2-propyl phenylclopentylacetate, homopiperazinoethyl benzilate, homopiperazinopropyl phenylcyclohexyl glycolate and homopiperazinopropyl phenylcyclopentyl glycolate.

Acid addition salts are produced by contacting the compounds with a suitable acid such as formic acid, citric acid, maleic acid, sufuric acid, hydrochloric acid, succinic acid, tartaric acid, benzoic acid or fumaric acid.

Quaternary ammonium salts are formed by contacting the compounds with a suitable alkylating agent such as dimethyl sulfate or an alkyl halide such as methyl chloride or ethyl bromide.

The active agents of this invention may be administered to animals and humans as pure compounds. It is advisable, however, to first combine one or more of the novel compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be use to form powders. The powders may be use as such for direct administration to a patient or, instead, the powders may be added to suitable foods and liquids, including water, to facilitate administration.

The powders may also be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capusules may contain any suitable predetermined amount of one or more of the active agents as a nontoxic acid addition salt and may be administered one or more at a time at regular intervals. Such unit dosage forms, however, should generally contain a concentration of 0.1% to 10% by weight of one or more of the active piperazines.

A typical tablet may have the composition:

| | Mg. |
|---|---|
| (1) 4-methyl homopiperazinopropyl benzilate dihydrochloride | 10 |
| (2) Starch, U.S.P. | 57 |
| (3) Lactose, U.S.P. | 73 |
| (4) Talc, U.S.P. | 9 |
| (5) Stearic acid | 6 |

Powders 1, 2 and 3 are slugged, then granulated, mixed with 4 and 5, and tableted.

Capsules may be prepared by filling No. 3 hard gelatin capsules with the following ingredients, thoroughly mixed:

| | Mg. |
|---|---|
| (1) 4,5-dimethyl homopiperazinopropyl benzilate dihydrochloride | 5 |
| (2) Lactose, U.S.P. | 200 |
| (3) Starch, U.S.P. | 16 |
| (4) Talc, U.S.P. | 8 |

The oral route is preferred for administering the active agents of this invention.

The following examples are presented to illustrate specific embodiments of the invention.

EXAMPLE 1

*1-Methyl-4-(Carbomethoxyethyl)-Homopiperazine*

A mixture consisting of 114.2 g. (1.0 mole) of 1-methyl homopiperazine, 172.2 g. (2.0 mole) of methyl acrylate and 250 cc. of dry benzene was placed in an autoclave which was heated to 100° C. for five hours. The solvent and excess acrylate ester were removed by distillation and the residue was vacuum distilled, B.P. 112–113° C. (2.5 mm.), yield 181.5 g. (90.7%), $N_D^{25}$ 1.4698.

*Analysis.*—Calcd. for $C_{10}H_{20}N_2O_2$ N, 14.0. Found: N, 14.0.

EXAMPLE 2

*4-Methyl-Homopiperazinopropanol*

To 14.8 g. (0.4 mole) of LiAlH₄ in 500 ml. of tetrahydrofuran at reflux was added dropwise and with stirring, 100.1 g. (0.5 mole) of 1-methyl-4-carbomethoxyethyl homopiperazine in 200 ml. of tetrahydrofuran. The mixture was stirred and refluxed for 3 hours additional. The mixture was cooled and excess hydride decomposed with 12 ml. of water and the complex with 70 ml. of 40% potassium hydroxide. Inorganic salts were filtered off, the filtrate washed with tetrahydrofuran and the organic fraction dried over anhydrous potassium carbonate. The solution was filtered and solvents removed in vacuo through a 10″ column. Fractionation of the residue through a 5″ column in vacuo gave the product, B.P. 75–78° C./0.2 mm., 75.5 g. (87.5%).

*Analysis.*—Calcd. for $C_9H_{20}N_2O_2$: N, 16.26; $N_D^{25}$ 1.4878. Found: N, 16.15; $N_D^{25}$ 1.4899.

EXAMPLE 3

*4-Methyl-Homopiperazinopropylbenzilate Dihydrochloride*

A mixture of 17.2 g. (0.1 mole) of 4-methyl-homopiperazino-3-propanol, 24.2 g. (0.1 mole) of methyl benzilate, 250 ml. of n-heptane, 2 ml. of methanol and a total of 0.5 g. of sodium methoxide was stirred at reflux until separation of methanol ceased. The reaction mixture was filtered warm, diluted with chloroform, washed two times with 50 ml. of water, dried briefly over anhydrous potassium carbonate, filtered and the solvents removed in vacuo. The crude ester (34 g., 89%) was dissolved in 700 ml. of anhydrous ether and acidified with ethereal HCl. A heavy white precipitate formed.

The hygroscopic precipitate was filtered under anhydrous conditions; 33.5 g. (83%). All the salt was suspended in 500 ml. of hot ethyl acetate. It became a yellow gum which crystallized upon warming and stirring. The mixture was cooled, filtered and the product oven dried, M.P. 187–188° C., 31..1 g. (93% recovery).

*Analysis.*—Calcd. for $C_{23}H_{32}Cl_2N_2O_3$: N, 6.15; Cl⁻, 15.57. Found: N, 6.09; Cl⁻, 15.32.

EXAMPLE 4

*4-Formyl-5-Methyl Homopiperazine*

A mixture consisting of 57.1 g. (0.5 mole) of 5-methyl homopiperazine and 30 g. (0.5 mole) of methyl formate was refluxed for two hours. The alcohol was distilled off, and the product was collected by distillation, B.P. 101–102° C. (0.55 mm.). Yield 54.4 g. (76.7%), $N_D^{25}$ 1.5011.

*Analysis.*—Calcd. for $C_7H_{14}N_2O$: N, 9.85. Found: N, 10.06.

EXAMPLE 5

*1-Carbomethoxyethyl-4-Formyl-5-Methyl Homopiperazine*

A mixture consisting of 54.4 g. (0.38 mole) of 4-formyl-5-methyl homopiperazine, 65.5 g. (0.78 mole) of methyl acrylate and 200 cc. of dry benzene was placed in an autoclave which was heated to 100° C. for four hours. The solvent and excess acrylate ester were distilled off, and the product was vacuum distilled, B.P. 163–164° C. (0.6 mm.). Yield 58.5 g. (67.5%), $N_D^{25}$ 1.4899.

*Analysis.*—Calcd. for $C_{11}H_{20}N_2O_3$: N, 6.13. Found N, 6.46.

EXAMPLE 6

*4,5-Dimethyl Homopiperazinopropanol*

To 19 g. (0.50 mole) of lithium aluminum hydride in 400 cc. of tetrahydrofuran was added a solution consisting of 57.75 g. (0.25 mole) of 1-carbomethoxyethyl-4-formyl-5-methyl homopiperazine and 100 cc. of tetrahydrofuran in forty-five minutes. The mixture was refluxed for three hours. The excess lithium aluminum hydride was destroyed with 15 cc. of water, and the complex was decomposed with 40 cc. of 40% potassium hydroxide solution. The inorganic salts were filtered off, the filtrate was dried over potassium carbonate, and the product was collected by distillation, B.P. 105–106° C. (0.3 mm.). Yield 40 g. (86%), $N_D^{25}$ 1.4884.

*Analysis.*—Calcd. for $C_{10}H_{22}N_2O$: N, 15.03. Found: N, 14.94.

EXAMPLE 7

*4,5-Dimethyl Homopiperazinopropylbenzilate Dihydrochloride*

A mixture consisting of 24.2 g. (0.1 mole) of methyl benzilate, 18.6 g. (0.1 mole) of 4,5-dimethylhomopiperazinopropanol, 0.5 g. of sodium methoxide, and 300 cc. of n-heptane was refluxed for six hours while 6 cc. of methanol was collected. The catalyst was filtered off. The filtrate was washed with water, dried over potassium carbonate, concentrated to dryness in vacuo, and weighed 36.1 g. (91%).

The residue was dissolved in 400 cc. of anhydrous ether and acidified to pH 2 with ethereal hydrochloric acid. The solid was filtered off and suspended in 400 cc. of boiling ethyl acetate, filtered and dried at 100° C. Weight 27.7 g. (59%), M.P. 176–177° C.

*Analysis.*—Calcd. for $C_{24}H_{34}Cl_2N_2O_3$: N, 5.96; Cl, 15.10. Found: N, 5.95; Cl, 14.99.

Various changes and modifications of the invention can be made and, to the extent that such variations incorporate the spirit of this invention, they are intended to be included within the scope of the appended claims.

What is claimed is:
1. 4-formyl-5-methyl homopiperazine.
2. 1-carbomethoxyethyl-4-formyl-5-methyl homopiperazine.

(References on following page)

References Cited in the file of this patent

UNITED STATES PATENTS

| | | |
|---|---|---|
| 2,419,366 | Northey et al. | Apr. 22, 1947 |
| 2,475,852 | Northey et al. | July 12, 1949 |
| 2,695,301 | Blicke | Nov. 23, 1954 |
| 2,917,536 | Holysz et al. | Dec. 15, 1959 |
| 2,926,172 | Boehme et al. | Feb. 23, 1960 |
| 2,948,731 | De Stevens | Aug. 9, 1960 |
| 2,953,565 | Faust et al. | Sept. 20, 1960 |
| 2,957,867 | Werner | Oct. 25, 1960 |
| 2,957,872 | Huebner | Oct. 25, 1960 |
| 2,993,900 | Biel | July 25, 1961 |

OTHER REFERENCES

McElvain et al: Jour. Amer. Chem. Soc., vol. 76, pp. 1126–37 (1954).

Chemical Abstracts, vol. 52, pp. 15549–50 (1958), abstracting Wadia et al., J. Sci. Ind. Research (India), 17B–31–32 (1958).

Ratouis et al.: Bull. Soc. Chim., France, 1959, pp. 576–80.